May 19, 1964  J. B. BRUSH  3,133,293
FOLDABLE CATAMARAN
Filed April 8, 1963  5 Sheets-Sheet 1
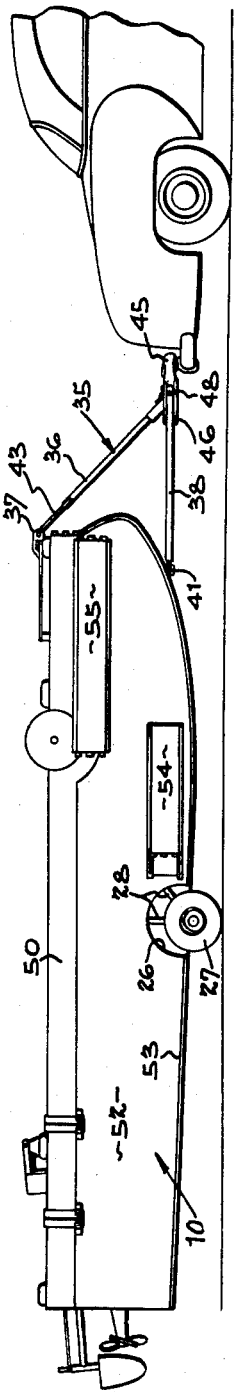
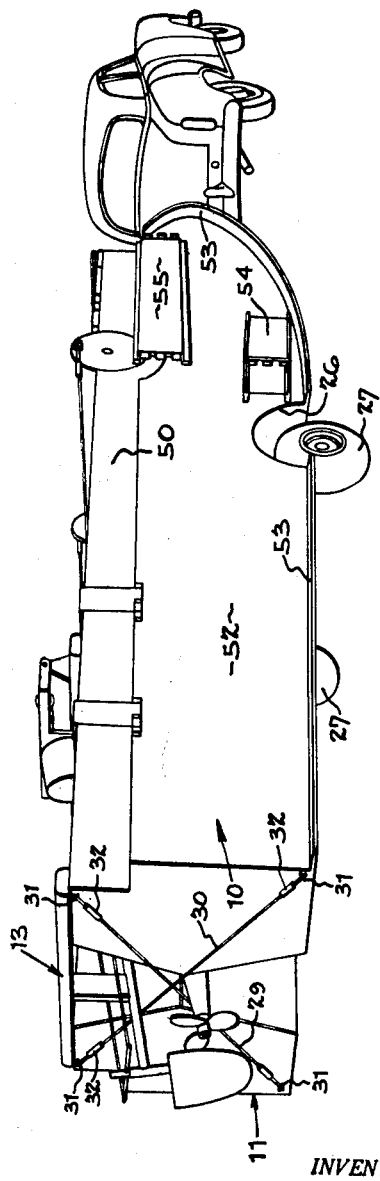
INVENTOR
*John B. Brush.*
BY
ATTORNEYS.

May 19, 1964     J. B. BRUSH     3,133,293
FOLDABLE CATAMARAN

Filed April 8, 1963     5 Sheets-Sheet 3

INVENTOR
John B. Brush.
BY
ATTORNEYS.

May 19, 1964
J. B. BRUSH
3,133,293
FOLDABLE CATAMARAN
Filed April 8, 1963
5 Sheets-Sheet 5
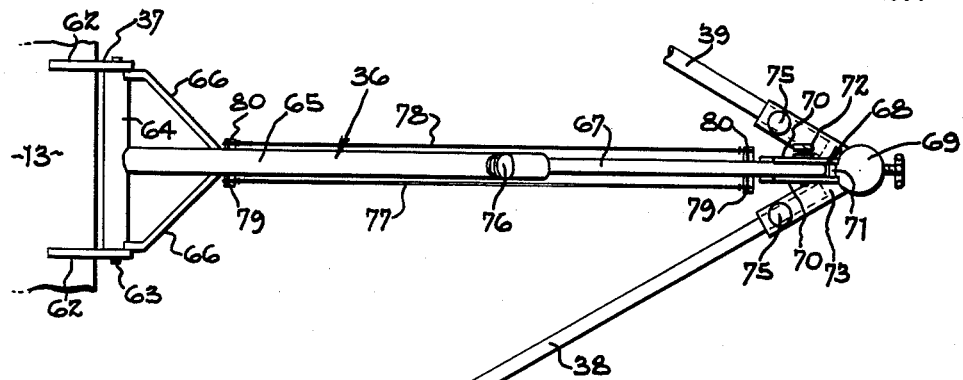
FIG. 7
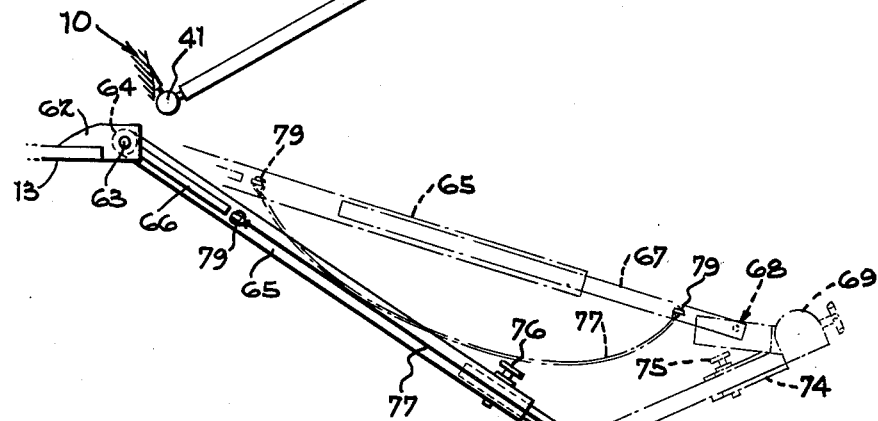
FIG. 8
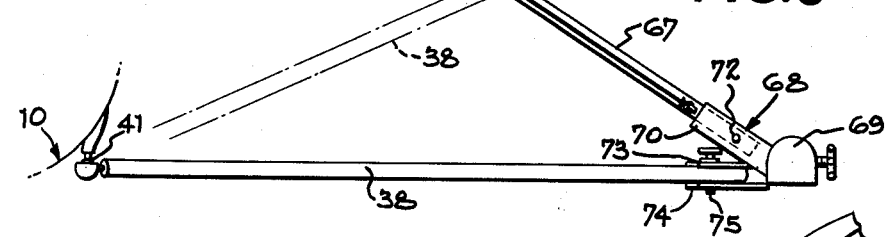
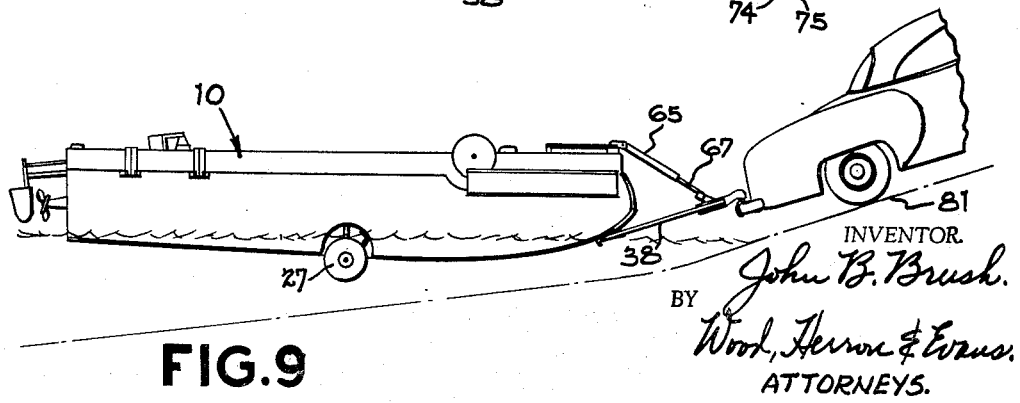
FIG. 9
INVENTOR.
John B. Brush.
BY
Wood, Herron & Evans.
ATTORNEYS.

United States Patent Office 3,133,293
Patented May 19, 1964

3,133,293
FOLDABLE CATAMARAN
John B. Brush, 2 Beech Knoll Drive, Cincinnati, Ohio
Filed Apr. 8, 1963, Ser. No. 272,821
7 Claims. (Cl. 9—1)

This invention relates to boats, and it is directed in particulr to boats of the catamaran class. This application is a continuation in part of Serial No. 114,274, filed May 11, 1961, now abandoned, which was a divisional application of Serial No. 741,110, filed June 10, 1958, now Patent No. 3,067,439.

Typically, a catamaran consists of two hulls which are arranged side by side and joined by a framework of some sort which may support a mast, deck structure, a cabin, a power unit or various combinations of these things, depending upon the intended use of the boat. Regardless of its intended use, the overall width or beam (which includes the twin hulls and the space in between them) of a catamaran of any practical size, is substantially greater than the width of an ordinary automobile. Consequently, it is impossible to trail a catamaran behind an automobile in the same way that a small pleasure boat is adapted to be trailed, because the hulls project substantially beyond the sides of the automobile and create a traffic hazard on roads.

With this in mind, it has been an important objective of the invention to provide a catamaran which may be folded so as to decrease its overall width to a point where it may be trailed safely behind an automobile with the same driving care one uses with an average outboard runabout.

Another objective of this invention has been to provide a foldable catamaran incorporating wheels which rest upon the ground when the boat is folded so that the boat structure may ride upon these wheels, it being unnecessary to provide a trailer as such for transporting the catamaran from place to place.

In the fulfillment of the above objectives I provide a catamaran which mounts two wheels outboard of the sides of the twin hulls. The boat structure is adapted to be folded such that the bottoms of the two hulls are positioned adjacent to one another. This decreases the overall width or beam of the boat to the extent required for safe trailing, and it also positions the two wheels so that they, along with the folded boat, constitute a "trailer" structure which can be attached by means of a draw bar and an ordinary trailer hitch to the rear of an automobile.

Another objective of the invention has been to provide a foldable catamaran of the type set forth which floats freely while it is in the folded condition. In the preferred embodiment, each hull is hollow and completely watertight. The two hulls are joined by framework which is laterally rigid. The inboard sides of the hulls are hinged to this framework, and the hulls swing down and underneath the framework in order to fold. Thus, the folding interferes in no way with anything mounted upon the framework so that the boat is adapted for a number of different uses. More importantly, however, the hulls, being watertight, float upon their outboard sides when the boat is backed into the water at a launching site. With the hulls floating freely, the boat may be unfolded by swinging the two hulls simultaneously out into their normal floating positions.

Preferably, and in the preferred embodiment of the invention, means are provided for moving the hulls between their folded and unfolded positions from a remote point, such as from the shore at the launching site. Thus, the boat may be unfolded or folded while the hulls are afloat, and it is not necessary for a person to wade into the water at the time of launching or at the time the boat is to be pulled from the water.

Another important objective of the invention has been to provide a foldable catamaran of the type set forth which is adapted to carry an automobile and to be powered by the automobile. Thus, the boat of this invention may be trailed behind an automobile to a launching site. The automobile then may be driven aboard the boat, the two becoming in effect a "cruiser." At the launching site the folded boat is backed into the water and while it is still attached to the automobile by means of the draw bar, the two hulls are unfolded. Each hull includes a track for the front and rear wheel at one side of the automobile. These two tracks are automatically positioned directly behind the wheels of the automobile they are to receive when the boat is launched and unfolded as described above with the boat attached by the draw bar to the automobile. Removable ramps are provided and these ramps are so arranged that they extend from the tracks on the hulls to positions immediately in back of the two rear wheels of the automobile. These ramps preferably are put in place while the draw bar is still attached so that upon removal of the draw bar, the automobile may be backed directly upon the catamaran with complete assurance that the wheels of the automobile are in direct alignment with the tracks on the hulls.

The invention also contemplates a foldable catamaran which, when in the folded condition, becomes a trailer so that it may be transported over roads. The invention also contemplates a catamaran adapted to carry and to be powered by an automobile. Additionally, the invention concerns a catamaran design in which one hull is permitted to pitch relative to the other with a large mass (which may be a motor, a passenger compartment or both) mounted upon the framework connecting the two hulls by means of springs so that the spring, in combination with the relative pitching permitted between hulls insulates the mass from forces applied to the hulls while moving through rough water.

Other objectives and advantages of the invention will be readily apparent to those skilled in the art from the following detailed description of the drawings in which:

FIGURE 1 is a side elevational view of a catamaran incorporating the principles of this invention showing the catamaran attached to the rear of an automobile in condition for trailing.

FIGURE 2 is a perspective view showing the catamaran in condition for being trailed behind an automobile.

FIGURE 7 is a top plan view of a modified form of the tow bar in which provision is made for telescoping the bar that connects the forward end of the frame of the catamaran to a trailer hitch.

FIGURE 8 is a side elevational view of a modified form of the draw bar.

FIGURE 9 is a diagrammatic view of a launching illustrating a modified form of the draw bar.

Figure 3:
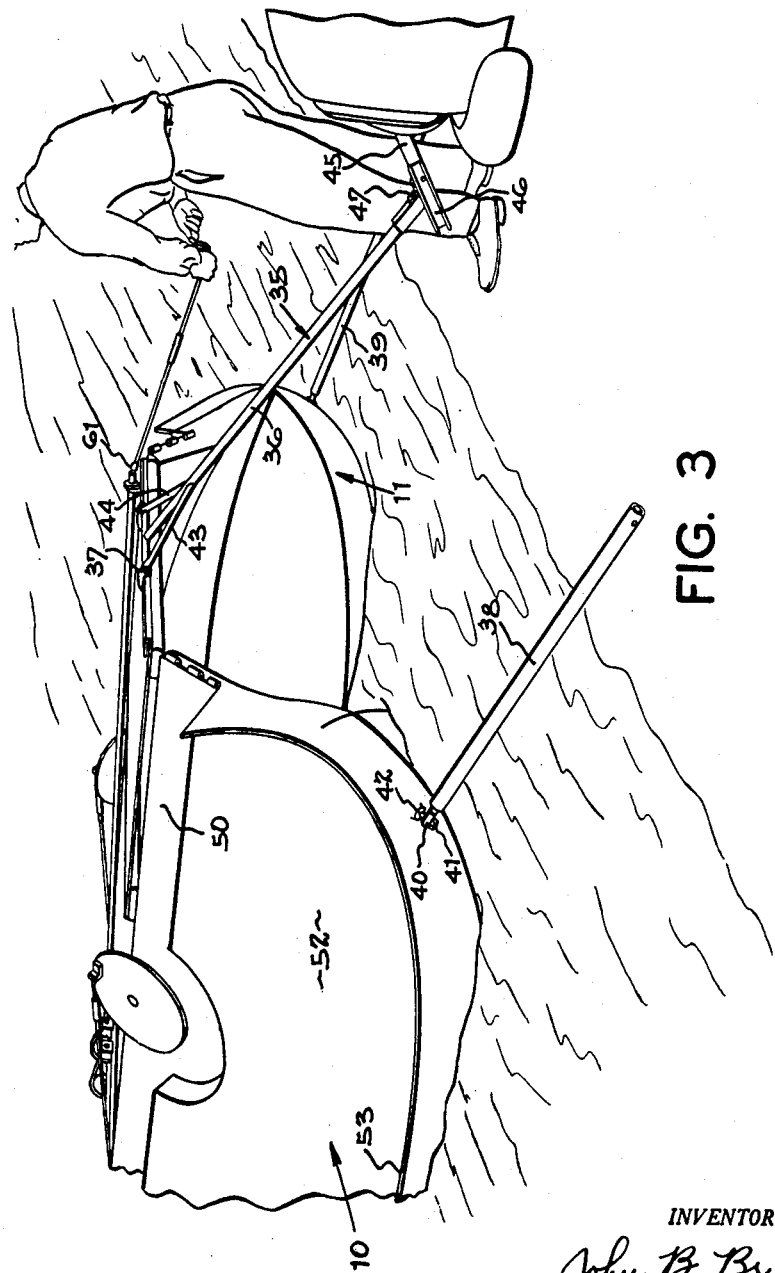
FIGURE 3 is a fragmentary perspective view illustrating the manner in which the twin hulls of the catamaran may be folded or unfolded while they are floating upon the water at a launching site.

The catamaran of this invention consists essentially of twin hulls designated generally 10 and 11, hull 10 being at the right side of the boat and hull 11 being at the left side of the boat. The two hulls are fastened together by laterally rigid frame members designated generally by the numeral 13, which join the gunwals of the two hulls, and tension members designated 14 which, as disclosed in greater detail in application Serial No. 741,110, now Patent No. 3,067,439, join the two hulls at their chine lines.

Figure 5:
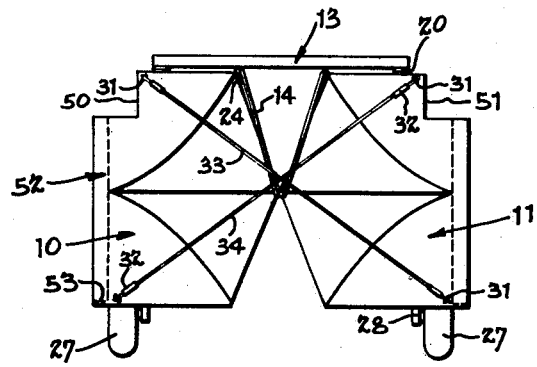
FIGURE 5 is a semi-diagrammatic front elevational view of the catamaran in folded condition.
Figure 6:
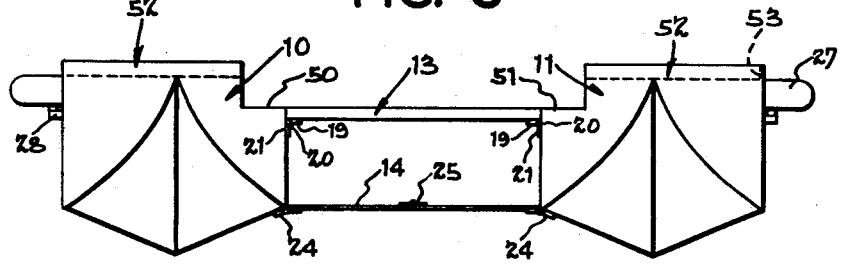
FIGURE 6 is a semi-diagrammatic front elevational view of the catamaran showing it in unfolded condition with the two hulls in normal floating attitude.

As best appears in FIGURES 5 and 6, each end of each cross member is welded to one leaf 19 of a hinge designated 20. The other leaf, designated 21 of the hinge 20 is affixed to a hull along a gunwale and thus with four frame members shown there are eight hinges of the type described and the hinges are arranged so that the two hulls can be pivoted on the hinges to swing into positions in which they are bottom to bottom below the frame members, this position being shown in FIGURE 5.

Two tensioning members such as the one indicated at 14 in FIGURE 6 are employed. One of these tensioning members joins the two hulls at their chine lines below the frame member 17. The opposite ends of each tensioning member are hinged to the hulls by means of hinges 24—24. Additionally, each tensioning member is hinged at its mid-line as shown at 25 so that the tensioning member breaks downwardly along its center line when the two hulls are folded bottom to bottom as illustrated in FIGURE 5. It will be appreciated that the boat under load conditions will maintain the tensioning members in the straight condition illustrated in FIGURE 6.

The frame members shown are intended to be representative only. More or less may be utilized depending upon the size and the intended function of the boat. The frame members shown may serve as base framework for a cabin or other structure as dictated by the intended use of the boat. The specific hull design which is shown may be modified to adapt it to specific uses. The shallow V bottom shown is primarily utilitarian in nature and is representative only of a number of different designs which will be apparent to those skilled in the art. Obviously, for sailing purposes the hulls may be substantially narrower and deeper, whereas if it is desired to power the boat by a motor for traveling at high rates of speed, the bottoms of the hulls may be substantially flat or even stepped for planing purposes. It is preferred, however, that each hull be completely enclosed and water tight as illustrated and appropriate bulkheads (not shown) may be used in each hull to provide a plurality of water tight compartments for safety.

Each hull, at its outboard side just below the gunwale, has a semi-circular well 26 formed in it in which a pneumatically tired wheel 27 is mounted by means as shock struts 28. These shock struts may be fabricated following known techniques of the aircraft industry and it is believed unnecessary to either show or describe them in detail. As shown, a little more than one-half of each wheel is exposed outboard of each hull. When the catamaran is in the folded condition illustrated in FIGURES 1, 2 and 5, the two wheels rest upon the ground and provide, with the folded boat, a trailer structure. When the catamaran is unfolded and in the floating condition illustrated in FIGURE 6 the two wheels constitute bumpers or fenders and it is preferred, for this reason, that they remain in place while the boat is on the water. Obviously, if desired the two wheels can be arranged so that they can be removed or retracted when the boat is afloat.

A crank operated system, 61, described in the application Serial No. 741,110, now Patent No. 3,067,439, is provided to assist in the folding and unfolding of the boat. However, when the boat is folded and in trailing condition the two hulls are secured by means of two pairs of cables, one pair being located at the stern and the other pair being located at the bow. The two cables of the pair at the stern are designated 29 and 30. These cables are arranged in crossed relation with one cable joining the inboard gunwale of the hull at the left to the outboard gunwale of the hull at the right. The other cable joins the inboard gunwale of the hull at the right to the outboard gunwale of the hull at the left. Appropriate hooks such as those designated 31 are permanently fastened in place to the hulls and the ends of the cables are provided with eyes which engage the hooks. Additionally, one or more turnbuckles 32 are provided in the cable lines, the turnbuckles being loosened when the cables are to be disengaged and tightened after engagement. The two cables of the pair at the bow are designated 33 and 34. These cables are also arranged at the crossed relation and hooks 31 and turnbuckles 32 are employed.

A tow bar assembly 35 is secured to the bow of the boat. It is preferred that the tow bar assembly be constructed as shown utilizing three tubular members, one of which, indicated at 36, is pivotally attached by means of a bracket 37 to the forward frame member 13 of the boat. The other two tubular members are identified by 38 and 39 respectively, member 38 being attached to the right hull and member 39 being attached to the left hull. The attachment to the hull, in each instance, is by means of a ball socket or universal joint member 40 which is secured in place to the rear end of the tubing member. A ball and bolt 41 fastens into a bushing 42 which is welded or otherwise affixed to the hull. As shown in FIGURE 3, the end of tubular member 36 which is pivoted on bracket 37 may be rigidified by two side braces 43—44. Member 36 can be telescoped as shown in FIGURE 1. The numeral 45 identifies a trailer hitch which, at its forward end may be of conventional construction. The rear part of the hitch is modified by mounting two channel members 46—46 at the sides thereof, only one of which is shown in FIGURE 3, this channel member being angulated to receive the forward end of tubular member 38. The other side of the trailer hitch carries a similar channel member and it is angulated to receive the forward end of tubular member 39. The forward end of the tubular member 36 is hinged to the trailer hitch as indicated at 47. The two channel members 46—46 of the hitch 45, and the forward ends of tubular members 38 and 39 are apertured to receive two pins 48 by means of which the tubular members 38 and 39 may be removably secured to the hitch. It may be appreciated therefore, that with the catamaran in folded condition as shown in FIGURES 1, 2 and 5 and the draw bar assembly attached to the trailer hitch, the boat may be towed from place to place with no more difficulty than the towing of a small pleasure boat.

Various adjustments and modifications may be made in the tow bar assembly. For example, the other tubular members may be made to telescope, with appropriate locks being provided, to position the boat relative to the automobile. An expedient of this type is helpful in launching under certain conditions and particularly in the launching of a catamaran designed to carry an automobile.

The hulls which are shown in the drawings are designed specifically to carry an automobile. For this purpose the inboard side of each hull is stepped down, as best appears in FIGURE 6, to provide a track or ramp for the wheels of the automobile. The ramp on the right hull 19 is designated generally by the numeral 50. The ramp on the left hull 11 is designated generally 51. The ramps may extend the full lengths of the hulls as shown. Although it is not necessary that the ramps be at the inboard side of each hull, this arrangement is preferred, because it provides a substantially wide deck area, indicated generally at 52, at each side of the automobile when it is on board the craft. It is preferred that a permanent gunwale 53 be installed around the outside of each deck extending from the ramp, around the bow of the hull, back to the well 26, and then continuing from the well to the stern of the hull. The gunwale 53 may include means for attaching removable railing structure if desired.

Removable ramps are provided over which the automobile may be driven onto the tracks 50 and 51. Each of these removable ramps is made in two parts. See FIGURE 4. One part indicated at 54, is designed to rest upon the short. The other part indicated at 55, which preferably is channel shaped as shown, is designed to bridge the space between the part 54 and the hull of the boat. The two ends of the channel shaped ramp 55, the forward end of the ramp on the hull, and the rear end of the ramp part 54 are configured to provide hinge joints which are connectable by means of removable hinge pins 56 and 57 respectively. Thus, the two channel-shaped ramps 55 may be attached to the hulls by aligning the hinge joints and inserting the two pins. The same thing may be done to connect parts 54 and 55. In each case the hinge pins are attached to the channel-shaped ramps by means of safety cables 58 so that they do not become lost. As shown, the two parts 54—54 of the removable ramps, which rest upon the shore, are wedge-shaped and they may be made, following aircraft fabrication techniques, of aluminum or other light weight material. The same type construction may be used for the parts 55—55. When the boat is folded, the parts of the removable ramp for the right hull are attached to the deck of the right hull as shown in FIGURES 1 and 2 by appropriate fasteners. The parts of the other removable ramp may be attached to the left hull in the same way.

Figure 4:
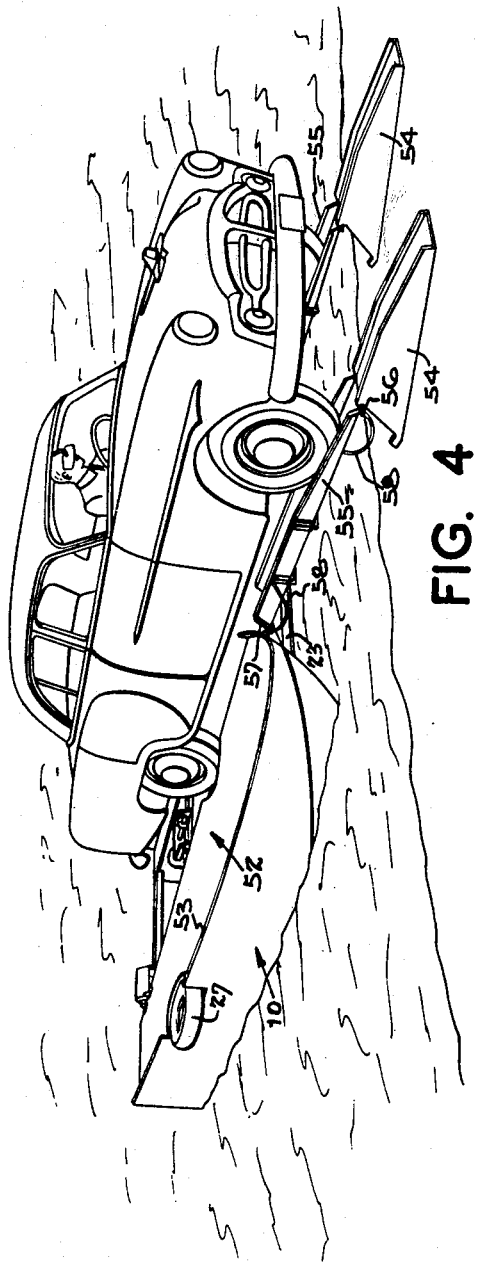
FIGURE 4 is a perspective view showing an automobile being backed onto the catamaran at a launching site.

In a typical launching, starting with the catamaran in folded condition for towing, the boat is backed to the water's edge. The two pairs of cross cables 29 and 30 at the stern of the boat and the two pairs of cables 33 and 34 at the bow of the boat then may be removed. The two sets of removable ramps 54—55 may also be removed from their positions of attachment to the decks of the hulls. The boat then may be backed into the water until the two wheels 27—27 float free of the bottom. After this, the two tubular connectors 38 and 39 of the draw bar assembly may be disconnected from the trailer hitch. At this time and as described in detail in patent application Serial No. 741,110, now Patent No. 3,067,439, the two hulls are caused to float apart and into their normal floating attitudes illustrated in FIGURE 6. The two tubular members 38 and 39 of the tow bar assembly may be removed completely if desired. With the two hulls in floating attitude the removable ramps may be assembled as shown in FIGURE 4. This is done with the boat still attached to the trailer hitch, which automatically positions the boat such that the two ramps are close to and in alignment with the rear wheels of the automobile. If the body of water has a current in it, it may be necessary to tie a rope from the side of the upstream hull to a point on short upstream of the automobile to maintain the boat in alignment with the wheels. The tube 36 of the tow bar assembly may be uncoupled from the car by detaching and dropping trailer hitch 45 and the car backed up the ramp and onto the boat. Thereafter, the tow bar and trailer hitch may be swung straight up and held in this position by an appropriate tie, or it may be removed from the boat completely by disengaging mount bracket 37.

Reference is now made to FIGURES 7, 8 and 9 which shows a preferred embodiment of a tow bar assembly. In this embodiment, the middle member 36 is arranged to telescope within set limits. The forward frame member of the catamaran is indicated diagrammatically at 13. The hull at the right is shown diagrammatically only at 10. Forward frame member 13, in this instance, mounts a bracket designated generally by the numeral 37 consisting of two arms 62—62 that are welded or otherwise affixed to frame member 13 in spaced parallel relation. A pivot pin 63 extends between the forward ends of arms 62—62 and a sleeve 64 is supported between the arms 62—62 on pin 63. An elongated tube 65 is welded to the side of sleeve 64 midway between its ends to extend at right angles to the sleeve. Tube 65 is rigidified by two angularly disposed braces 66—66 which are welded or otherwise secured to the opposite sides of tube 65 and which extend to the opposite ends of sleeve 64 where they are welded or otherwise affixed. A second elongated tube 67, that is smaller in diameter than tube 65, is adapted to telescope into the forward end of tube 65. The forward end of the tube 67 is removably received in a U-shaped fastening bracket 68 that is welded or otherwise affixed to a conventional trailer hitch socket 69. The bracket 68 comprises two side walls 70—70 that parallel one another, being connected at their forward ends by a web 71. The arms 70—70 of the bracket are spaced apart such that they embrace the opposite sides of the forward end of tube 67 in slip-fit relation. The two arms 70—70 and the tube 67 are bored to receive a removable pin 72 which holds the tube 67 within the bracket while permitting relative rocking motion of the tube 67 within the bracket as will be seen. The two tubular members 38 and 39 that attach the hulls to the trailer hitch at the sides are substantially identical to those previously described and shown in FIGURES 1-6, that is, they are attached to the hulls, in each instance, by a ball socket connector 41. The forward end of each of the tubular members 38 and 39 is engaged between upper and lower arms 73 and 74 respectively of a mount bracket similar to bracket 68 but in this instance, the arms 73 and 74 engage the tops and bottoms of the forward ends of the tubular members. As in the case of bracket 68, the brackets for tubular members, 38 and 39 and the tubular members adjacent to the forward ends are drilled to receive a removable pin 75 for locking the tubular members to the socket 69 of the trailer hitch assembly.

In trailing positions, the tubular members 38 and 39 are substantially horizontal, and tube 67 is telescoped sufficiently far into tube 65 to provide a rigid assembly. Both of the tubes 65 and 67 are bored to receive a removable pin 76. The pinned condition of the two tubes provides a rigid interconnection between bracket 68 and frame member 13 for towing purposes. When in this condition, two cables 77 at the right and 78 at the left are taut, extending along the two sides of tubes 65 and 67 between two lugs 79—79 at the right that the welded respectively to the side of tube 67 adjacent to its forward end and to tube 65 adjacent to angulated brace 66. This construction is duplicated at the left side of the two tubes, the lugs being shown at 80—80.

As has been explained, in the initial launching of the catamaran, it is backed into the water and since the hulls are entirely water-tight, they float on their sides. This is shown diagrammatically in FIGURE 9. Were the draw bar assembly entirely rigid, the catamaran would be held such that its longitudinal axis would parallel the longitudinal axis of the automobile to which it is attached, and if the bank or ramp, shown diagrammatically at 81 in FIGURE 9, were angulated to any degree with respect to the surface of the body of water at the launching site the stern of the catamaran would have to be forced down into the water. It has been found that this places a strain upon the draw bar assembly and particularly the middle member 36 of that assembly connecting frame member 13 to the trailer hitch. In the present instance however, when the catamaran, in trailing condition is backed toward the body of water, the pin 76 is pulled just prior to the catamaran entering the water. Under these conditions, the catamaran is free to assume its own floating attitude, since tube 67 is free to telescope up into tube 65. A condition of this sort is shown in dot-dash lines in FIGURE 8 and it is to be noted that the cables, the right one 77 only being shown, becomes slack. Therefore, at launching, the draw bar assembly provides complete control over the catamaran while still permitting it to assume its own floating attitude, which places no undue stress on any part of the tow bar assembly.

With the catamaran positioned as shown in FIGURE 9, the two tubular member 38, 39 at the sides of the draw bar assembly may be disconnected from the trailer hitch by pulling the pins 75—75 and swinging the members into the positions shown in FIGURE 3. The hulls then may be unfolded, floating outwardly into their normal floating attitudes while the catamaran is still attached to the automobile by the telescoping tubes 65, 67. The rear end of these telescoping tubes, being attached to frame member 13 by the pivotal connection of sleeve 64 to pin 63, permits the rear end of the telescoping tubes to lower as the hulls float outwardly from one another. Any tendency for the hulls to float away from the shore line is limited at the point when cables 77—78 becomes taut.

When the catamaran is pulled from the water, the telescoping action between tubes 65 and 67 also plays an important role. Initially, the forward end of tube 67 is pinned to bracket 68 while the hulls of the catamaran are in normal floating attitudes. The crank operated system disclosed in Patent No. 3,067,439 may be employed to fold the hulls by floating them into positions in which they are bottom to bottom. While this is being done, the forward frame member 13 rises with sleeve 64 pivoting on pin 63. With the hulls in folded condition, the two tubular members 38 and 39 may be pinned to the trailer hitch. Now, with the tubes 65 and 67 still unpinned, the catamaran may be pulled from the water by the automobile. During the initial movement, all of the pulling force is on tubular members 38 and 39 and the hulls are free to assume their own floating attitudes on their sides until the wheels 27 touch bottom. If the bank or ramp 81 is angulated to any substantial degree, the tube 67 telescopes well into tube 65. However, as the catamaran leaves the water, tubes 65 and 67 extend until cables 77—78 become taut. Once this occurs, pin 76 may be replaced and the draw bar assembly is in trailing condition.

Having described my invention, I claim:

1. A foldable catamaran adapted to be trailed behind an automobile, said catamaran comprising:
    a pair of hulls adapted to float on their sides as well as in normal attitudes,
    a pair of wheels, each wheel of the pair projecting beyond an outboard side of a hull,
    a frame member having the two opposite ends thereof hinged to the inboard sides of the respective hulls such that the hulls may be swung into positions in which they are bottom to bottom to bring said wheels into positions in which the hulls may be trailed upon them,
    removable means to hold said hulls bottom to bottom,
    a pair of elongated rigid members, each rigid member of the pair being pivotally attached to the forward portion of a hull,
    a draw bar secured to said frame member at the front center thereof and adapted for up and down swinging movement,
    means for removably fastening the forward ends of said rigid members and said draw bar to a trailer hitch,
    and a hinge in said draw bar adjacent to the forward end thereof to permit the rear end thereof to lower under circumstances in which the two rigid members are disengaged from the trailer hitch and the hulls are moved from a position in which they are floating on their sides into a position in which they assume their normal floating attitudes while the draw bar is still attached to said trailer hitch.

2. A foldable catamaran as set forth in claim 1 which said draw bar is adapted to telescope.

3. A foldable catamaran as set forth in claim 1 in which the hulls are configured to provide tracks for the wheels of said automobile.

4. A foldable catamaran as set forth in claim 3 in which removable ramps are provided to span the space between said tracks and the rear wheels of said automobile with the hulls in normal floating attitudes and with said draw bar attached to said trailer hitch.

5. A foldable catamaran adapted to be trailed behind an automobile, said catamaran comprising:
    a pair of hulls adapted to float on their sides as well as in normal attitudes,
    a pair of wheels, each wheel of the pair projecting beyond an outboard side of a hull,
    a frame having the opposite sides thereof hinged to the inboard sides of the respective hulls such that the two hulls may be swung into positions in which they are bottom to bottom to bring said wheels into positions in which said catamaran may be trailed upon them,
    a draw bar assembly at the forward end of said catamaran for attaching the catamaran to the rear of an automobile, whereby the catamaran may be backed into a body of water while attached to said automobile with the hulls bottom to bottom to float the wheels free of the bed of the body of water, and thereafter floated apart into normal floating attitudes,
    and said draw bar assembly having a hinge therein to permit the end thereof attached to the catamaran to lower as the hulls are floated apart, whereby said hulls may be floated apart while said draw bar assembly is still attached to the automobile.

6. The combination of a foldable catamaran adapted to be trailed behind an automobile and a draw bar assembly for attaching said catamaran to a trailer hitch, said combination comprising,
    a pair of hulls adapted to float on their sides as well as in normal attitudes,
    a pair of wheels, each wheel of the pair projecting beyond an outboard side of a hull,
    a frame having the opposite sides thereof hinged to the respective inboard sides of said hulls such that the two hulls may be swung from normal floating attitudes into positions in which they are bottom to bottom to bring said wheels into positions in which said hulls may be trailed upon them,
    a pair of tubular members,
    ball socket means connecting first ends of said tubular members to the respective hulls outboard of their center lines,
    a socket of a ball socket trailer hitch,
    means removably attaching second ends of said tubular members to said socket,
    a pair of telescoping tubular members,
    means removably pivotally attaching the forward end of one of said telescoping tubular members to said socket,
    means pivotally attaching the rear end of the other one of said telescoping tubular members, to said frame,
    means defining an extended position for said telescoping tubular members,
    and removable means for locking said tubular members in said extended position.

7. A foldable catamaran as set forth in claim 5 in which said draw bar assembly comprises,
    two tubular members including ball socket connections between the rear ends of said tubular members and each of the hulls,
    a trailer hitch,
    means removably fastening the forward ends of said tubular members to said trailer hitch,
    and a third member adapted to telescope having one end pivotally attached to said frame and the opposite end removably pivotally attached to said trailer hitch.

No references cited.